(12) United States Patent
Jivane et al.

(10) Patent No.: US 9,367,432 B2
(45) Date of Patent: Jun. 14, 2016

(54) TESTING SYSTEM

(75) Inventors: Moksha Suryakant Jivane, Maharashtra (IN); Nandita Babu, Maharashtra (IN); Sarang Kamlesh Barpatre, Maharashtra (IN); Jevanthi Priya C. K., Andhra Pradesh (IN); Sushant Vale, Pune (IN); Nikhil Patwardhan, Maharashtra (IN)

(73) Assignee: Tata Consultancy Services Limited (IN)

( * ) Notice: Subject to any disclaimer, the term of this patent is extended or adjusted under 35 U.S.C. 154(b) by 0 days.

(21) Appl. No.: 13/194,321

(22) Filed: Jul. 29, 2011

(65) Prior Publication Data

US 2012/0260234 A1    Oct. 11, 2012

(30) Foreign Application Priority Data

Dec. 24, 2010  (IN) .......................... 3536/MUM/2010

(51) Int. Cl.
  *G06F 11/36*  (2006.01)
(52) U.S. Cl.
  CPC .................................. *G06F 11/3684* (2013.01)
(58) Field of Classification Search
  CPC ............ G06F 11/2733; G06F 11/3696; G06F 11/3684
  USPC .................... 717/124–126; 702/119; 712/227
  See application file for complete search history.

(56) References Cited

U.S. PATENT DOCUMENTS

| | | | | |
|---|---|---|---|---|
| 5,377,203 | A * | 12/1994 | Khan | 714/744 |
| 5,495,571 | A * | 2/1996 | Corrie et al. | 714/38.1 |
| 7,861,226 | B1 * | 12/2010 | Episkopos et al. | 717/124 |
| 7,873,945 | B2 * | 1/2011 | Musuvathi et al. | 717/124 |
| 8,079,018 | B2 * | 12/2011 | Huene et al. | 717/124 |
| 8,108,826 | B2 * | 1/2012 | Li et al. | 717/106 |
| 8,291,384 | B2 * | 10/2012 | Takahashi | 717/124 |
| 9,015,667 | B2 * | 4/2015 | Meijer et al. | 717/124 |
| 2002/0120917 | A1 * | 8/2002 | Abrari et al. | 717/110 |
| 2003/0233631 | A1 * | 12/2003 | Curry et al. | 717/100 |
| 2006/0123294 | A1 * | 6/2006 | Vu | 714/726 |
| 2006/0193342 | A1 * | 8/2006 | Sarsfield | 370/466 |

* cited by examiner

*Primary Examiner* — Chat Do
*Assistant Examiner* — Sergio J Curbelo, III
(74) *Attorney, Agent, or Firm* — Schwegman, Lundberg & Woessner, P.A.

(57) ABSTRACT

The present subject matter relates a testing system for an application. The system includes a test data generation module to generate test data for a program code. The test data generation module in turn includes a relational expression creation module that determines a relational expression corresponding to a set of parameters of the program code based on a rule indicating a format of a valid test data for the parameters. A boundary recognition module identifies a set of boundary values of the parameters based on the relational expression. Further, a solver module then generates valid test data and invalid test data for the parameters based on the boundary values.

10 Claims, 3 Drawing Sheets

TESTING SYSTEM

CLAIM OF PRIORITY

This application claims the benefit of priority under 35 U.S.C. §119 of Moksha. Suryahant Jivane et al., Indian Patent Application Serial Number 3536/MUM/2010, entitled "TESTING SYSTEM," filed on Dec. 24, 2010, the benefit of priority of each of which is claimed hereby, and each of which are incorporated by reference herein in its entirety.

TECHNICAL FIELD

The present subject matter, in general relates to software testing and in particular, to generation of test data.

BACKGROUND

Software testing is an important phase in a software lifecycle. The efficiency and profitability of a software organization depends highly on its testing capabilities. Specifically, the software or program testing is an investigation carried out in order to provide stakeholders with data pertaining to the quality of the program under test. Normally, the program testing is carried out in order to determine, whether the program meets all technical and business requirements which define its design and development, and whether the program is working as expected.

With the rise in the trend to develop modular and large integrated software applications, the complexity of testing the software has increased. With the increased complexity as well as stringent quality requirements, the need for effective testing has increased in order to enable identification of errors that need to be fixed as well as the changes that are required in the functionality of the application.

SUMMARY

This summary is provided to introduce concepts related to generation of test data in a testing system for a software application. These concepts are further described below in the detailed description. This summary is not intended to identify essential features of the claimed subject matter nor is it intended for use in determining or limiting the scope of the claimed subject matter.

In one implementation of the present subject matter, a method(s) and system(s) of generating test data is described. The system includes a test data generation module to generate test data for a program code. The test data generation module further includes a relational expression creation module that determines a relational expression corresponding to at least one parameter of the program code. Such relational expression is determined based on a rule indicating a format of a valid test data for the parameters. Further, a boundary recognition module identifies one or more boundary values of the parameters based on the relational expression. A solver module then generates valid test data and invalid test data for the parameters based on the boundary values. Such valid test data denotes a first range of values limited by the boundary values and the invalid data denotes a second range of values lying outside the first range of values.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION OF THE DRAWINGS

The subject matter described herein relates to a testing system for testing a program code. Systems and methods related to the testing system as described herein can be implemented in a variety of devices. Examples of such devices include, but are not limited to, computing devices such as mainframe computers, workstations, personal computers, desktop computers, minicomputers, servers, multiprocessor systems, and laptops; cellular communicating devices such as personal digital assistants, smart phones, and mobile phones; DSP based devices, such as hearing aid devices; and the like. Typically, a software requirements specification document lists all the business and functional requirements in the form of business rules. Such requirements are fulfilled by a program code. Based on the software requirements specification, a testing team performs testing to check whether the program code fulfills the desired requirements. Accordingly, test data is provided to the program code and the functioning of the program code in response to the test data is observed. Typically, the program code is expected to function in a pre-specified desired manner in accordance with test data given to it.

For example, to test a program code expected to accept an account number as an input and display the account details such as name of the account holder, the account balance, etc., as the output. In such a scenario, the account number may be provided as a test data. The account number provided as a test data may be a valid test data or an invalid test data. A valid test data conforms to some pre-defined criteria, such as format, range to which the input is expected to pertain to, etc. In the above described scenario, for the program code, a valid account number may be a numeric string such as a 10 digit number. Accordingly, for this program code an account number that does not pertain to the valid test data format, such as an alphanumeric string, or a numeric string of less than 10 or more than 10 digits, is not a valid test data, or in other words is an invalid test data. In another example, for a program code, a valid account number may a numeric sting of 15 characters, and therefore, for different program codes, a valid test data may conform to different requirements. Thus, as apparent, invalid test data may be understood as the test data which does not confirms to the rules, formats and criteria as set for the valid test data.

While functioning of the program code can be predicted in cases where the test data i.e. account number in the present example, is valid or is in a predefined format; however the same cannot be predicted when the test data is invalid. With an invalid test data given to the program code, it can be determined whether the program code gives an error message, or it crashes with the invalid test data. This form of testing is important to determine the capability of the program code to handle invalid and exceptional inputs that produce erratic results.

Thus, an important aspect of testing involves testing the program code with invalid test data to determine the behavior of the program code. By doing so, it is ensured that when an invalid test data, for example, an exceptionally high value of an input, is provided to the program code, the program code does not function in an unexpected manner so as to disrupt the functioning of the program code itself, along with other associated programs or adversely affects the associated hardware. For example, it is important that the program code provides an error message and does not crash on providing the invalid test data. Such abnormalities are identified with the help of the invalid test data and rectified at the testing stage.

Conventionally, the invalid test data is generated manually by the testing team which is a tedious and complex task. For example, a testing team member may manually enter invalid format of entries, such as a combination of alphanumeric string and special characters, where only numeral entries are allowed. This is done repeatedly to check the behavior of the program code in response to the invalid test data. As the quantity of test data required for testing a program code as well as the length of the program code to be tested can be very high, manual entry of the invalid test data can be a time consuming and tedious task.

As a solution, production data that is pre-existing in an enterprise database may be employed to act as the test data input. However, employment of the production data as test data may pose a threat to the security, confidentiality and integrity of the production data. In addition, the production data is composed of only valid test data and thus may only be used for positive testing, leaving it to the testing professional to manually provide invalid test data. Accordingly, there is a need for an automated system that would generate at least operatively invalid test data thereby facilitating negative testing of the program code.

To this end, systems and methods for generating valid as well as invalid test data for testing a program code are described herein. In one implementation, a testing system determines one or more rules defining the valid test data to be given to the program code for testing. Based on the rules defining the valid test data, the system automatically determines the rules defining the invalid test data. In one implementation, a program code may have an inbuilt rule defining the valid test data. Therefore, in such a case, the system may automatically extract the rule for defining the valid test data from the program code. In another implementation, the rules can be defined manually through a user interface of the system. Considering the example in the preceding paragraphs, the system may determine the rule for defining the valid test data for an account number to be a 10 digit numeric string, either by automatically extracting the rule from the program code itself or by receiving this rule through the user interface from the user.

Once the rule for defining the valid test data is determined, the system generates a relational expression indicative of the rules defining valid test data for testing the program code. Generally, the rules are indicative of the ranges or formats of valid test data. Further, the system parses through the relational expression for analyzing the relational expression and understanding the rule for defining the valid test data for the program code. Subsequently, the entire relational expression is divided into smaller parts referred to as tokens. The tokens make the relational expressions simpler to be understood by the system.

In another example, if a particular format of a transaction id is AC24#586RS, the relational expression for the rule defining this valid transaction id can be very large. Therefore, the relational expression can be partitioned into tokens such as token1=(A and C), token2=(1-10), token3=(special character), token4=(1-8) and so on. In other words, instead of defining a single relational expression of the complete transaction id, the system may define that for a transaction id to be valid the first 2 characters forming a first token, namely token1, need to be alphabets A and C.

Similarly, the next token, namely token2, needs to be a numeral between 10 to 99, while the next character needs to be a special character and so on. Thus, a large relational expression may be broken into tokens such that a valid format or range of each token is defined by a rule. Thereafter, a lower and an upper boundary value of the valid test data is identified based on the identified tokens from the relational expression. For example, the token2 indicates the range of the valid test data to be 10 to 99, then the lower boundary value of the valid test data is 10 and the upper boundary value is 99. Accordingly, the system automatically identifies the boundary values for all the tokens in the entire relational expression. Once the system determines the tower and upper boundary for the valid test data of each token, the system solves each token with the corresponding boundary values to generate the valid test data.

Similarly, the system identifies a lower invalid boundary value and an upper invalid boundary value, corresponding to the identified boundary values. For example, in above described example, anything below 10 is invalid; therefore, 9 is identified as the upper invalid boundary value. Similarly, a lower invalid boundary value is identified as 100, as any number above 99 is invalid. Having determined the lower and upper invalid boundary values for each token, the system further solves each token based on the lower as well as the upper invalid boundary values to automatically generate the invalid test data.

In another example of generating test data, a program code that receives a parameter "month", a valid range of the input data for the month may be from '1' to '12', representing month January to month December. In the above mentioned example, a lower boundary value of the valid input data is '1' and the upper valid boundary value is '12', as the number of months in a year can range between '1' and '12'. Likewise, in the above mentioned example there also exists an invalid range of input data. A lower boundary value for the invalid input data is zero and an upper boundary value for the invalid input data may be '13'. Accordingly, an invalid value is any value which is not between 1 and 12.

In one implementation, the generated valid and invalid test data are displayed to the user through a user interface of the system. Further, in one implementation, the test data generated by the system can be provided to the user in a comma separated values (CSV) format, Microsoft Excel format, XML format, etc. In another implementation, the test data may be generated in a form specified by the user.

The testing system as described herein provides a reliable and efficient generation of test data which involves least human intervention and is free from human errors. Also, the system as described herein provides an easy mode of displaying the generated test data which can be further utilized by the testing team for testing the program codes.

Figure 1:
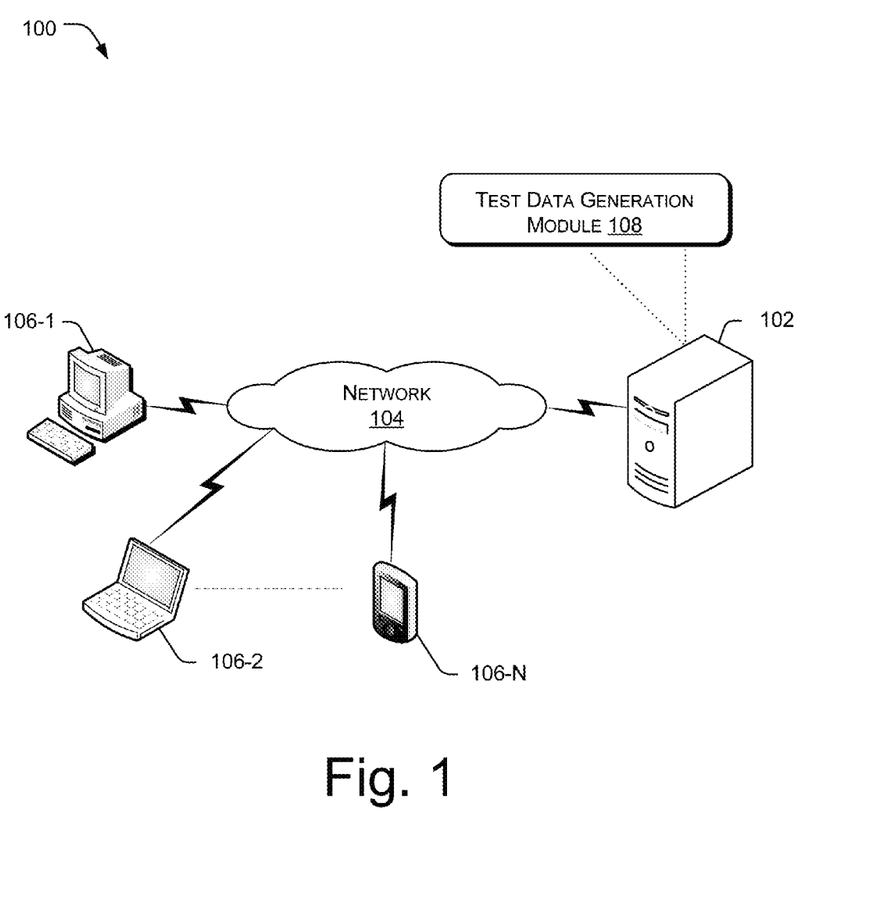
FIG. 1 illustrates an exemplary network environment implementing a testing system, in accordance with an embodiment of the present subject matter.
Figure 2:
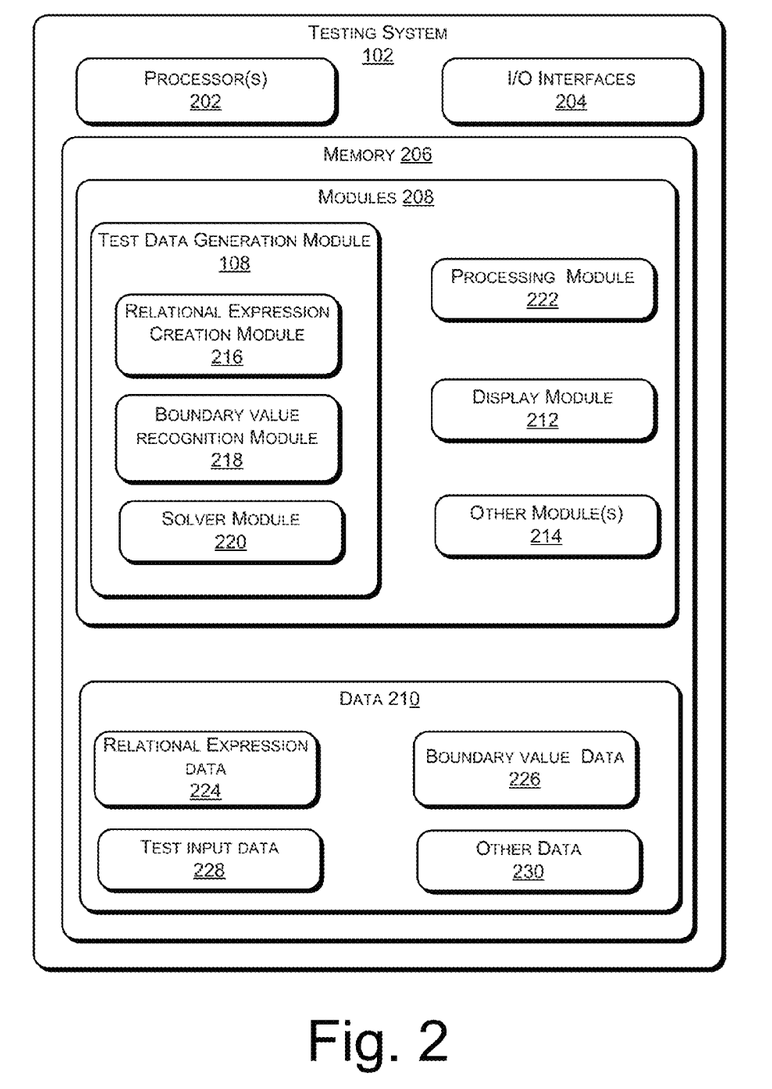
FIG. 2 illustrates an exemplary testing system, in accordance with an embodiment of the present subject matter.
Figure 3:
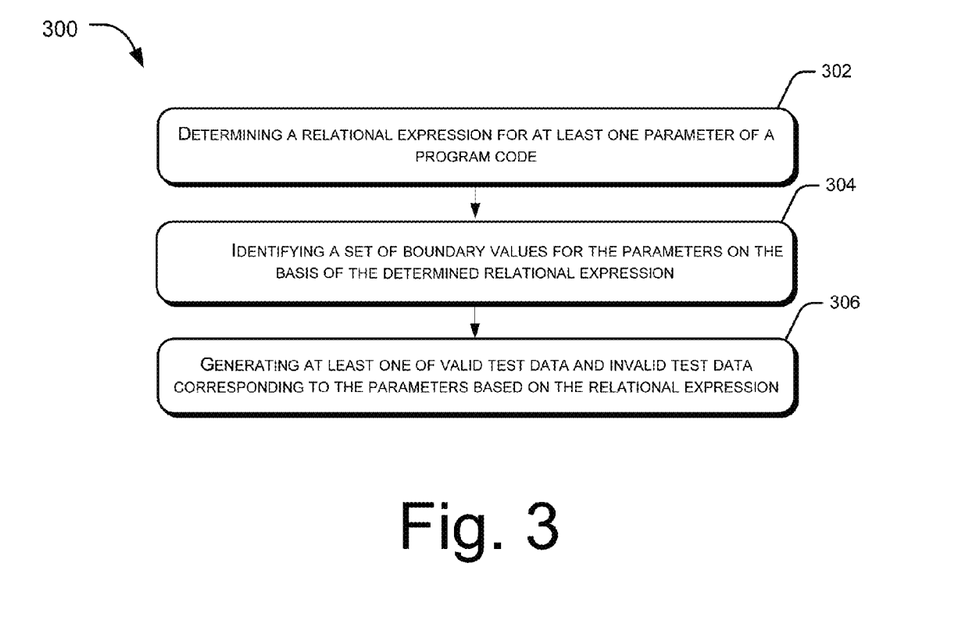
FIG. 3 illustrates an exemplary method for generating test data for an application, according to one embodiment of the present subject matter.

The manner in which the testing system is implemented shall be explained in detail with respect to the FIGS. 1-3. While aspects of the systems and methods can be implemented in any number of different computing systems environments, and/or configurations, the embodiments are described in the context of the following exemplary system architecture(s).

FIG. 1 shows an exemplary network environment 100 implementing a testing system 102 for managing testing activities related to testing of program codes, in accordance with an embodiment of the present subject matter. Specifically, the testing system 102 as described herein generates test data for testing the behavior of the program code. In one embodiment the testing system 102 may only generate the test data and the testing may be carried out by a separate testing tool. However, in another embodiment the testing system 102 may also be configured to accomplished testing of the program code by feeding test data as an input to the program code and the executing the program. In an example, in case of testing of the program code based on Java application, the test data is generated in the form of a number of Junit test cases by the testing system 102. Accordingly, the Junit is thereafter executed with the help of a junit based framework for feeding the test data to the program code and the executing the program code.

In the network environment 100 the testing system 102, communicates, via a network 104, with various client devices 106-1, 106-2, to 106-n. The client devices 106-1, 106-2, to 106-n are hereinafter collectively referred to as client devices 106. The testing system 102 and the client devices 106 may communicate for various purposes. For example, a testing professional may use the client device 106-1 to upload a program code as well as an associated business rule requesting the testing system 102 to generate test data and test the program code based on the business rule. In another example, the testing system 102 may communicate with a remotely located client device 106, such as the client device 106-2 to provide a set of valid and invalid test data to the client device 106-2. In said example, the client device 106-2 may further use the set of valid and invalid test data to test the program code stored therein in a testing environment.

The network 104 may be implemented as a wireless network, wired network or a combination thereof. The network 104 can be implemented as one of the different types of networks such as intranet, local area network (LAN), wide area network (WAN) and the internet. The network 104 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the network 104 may include network devices, such as network switches, hubs, routers and host bus adaptors (HBAs), for providing a link between the testing system 102 and the client devices 106. The network devices within the network 104 may interact with the testing system 102 and the client devices 106 through communication links.

The testing system 102 and the client devices 106 can be implemented as any of a variety of computing devices including, for example, a server, a desktop PC, a notebook or a portable computer, a workstation, a mainframe computer, a mobile computing device, an entertainment device or an internet appliance. In one example, the testing system 102 may be implemented in computing devices supporting various plugin types such as Eclipse 3.0 or above.

In an embodiment of the testing system 102, the testing system 102 includes a test data generation module 108 for generating test data. The generation module is configured to generate the test data lying in valid as well as invalid range of operation of the program code. The test data lying within the valid range and the invalid range may be hereinafter referred to as valid test data and invalid test data, respectively.

The generation module 108 is configured to determine one or more relational expression based on a set of rules associated with one or more parameters of the program code. Such rules indicate a format of a valid test data of the parameters. In one implementation the rules may be automatically extracted by the testing system 102. For example, the rules may be extracted based on requirement specifications, business constraints or business scenarios provided to the testing system 102. In other embodiments, the rules may be provided by a user through a user interface of the testing system 102. For clarity, following examples illustrate the requirement specifications and the business scenarios.

In an example of the requirement specification, a 'withdraw' function of a banking software specifies that an account number within a bank can be a numeric string of length 15, a bank account type can be either a regular account or a priority account. An amount associated with the regular can be a numeric figure from 100 to 50000 and with the priority account can be from 66000 to 110000. A balance amount associated with the regular account can be a numeric figure from 100 to 50000, while with the priority account, the balance amount can be from 60000 till 100000.

In an example of the business scenario, if the bank account in the previous example is regular, then the amount associated with bank account shall be lesser than or equal to the balance amount. If the bank account is priority, then the amount shall be lesser than or can be equal to 1.1 times the balance amount. In case of either of the bank account types, the amount can not go lesser than a numeric figure of 20000. The relational expression is then tokenized into a number of tokens. The relational expression is tokenized so that the relational expression is separated in the form of tokens. Thereafter, these tokens are parsed to identify a set of boundary values for the parameters. Typically, the parsing refers to the process of reading through the relational expression or the token in order to determine a syntactical structure thereof. Based on the parsing of the tokens, the set of boundary values of the parameters are identified, such that the boundary values are classified into a lower boundary value and an upper boundary value. As described earlier, all the values lying between the upper boundary value and the lower boundary value represent valid test data for the parameter, while the values lying outside the range of values defined by the upper boundary value and the lower boundary value are invalid test data.

Thus, in one embodiment, based on the upper and lower boundary values of the valid test data, a set of invalid test data for the parameters are derived. In another implementation, the upper and lower boundary values of the invalid test data of the parameters are identified directly by parsing the tokens. The upper and lower boundary values of the valid test data may also be referred to as valid upper boundary and valid lower boundary. Similarly, the upper and lower boundary values of the invalid test data may also be referred to as invalid upper boundary and invalid lower boundary. Accordingly, it may be understood that the identified set of boundary values is composed of valid boundary values and the invalid boundary values. As would now be understood, all values lesser than the invalid upper boundary and greater than the invalid lower boundary are values representing invalid test data for the parameter.

Further, for the purpose of generation of valid test data, the number of tokens of the relational expression is solved in accordance with corresponding valid upper and lower boundaries values of the parameters. Similarly, for generation of invalid test data the number of tokens of the relational expression are solved in accordance with corresponding invalid upper and lower boundaries values of the parameters. The solving denotes assigning of the values that lie between a range of lower boundary value and upper boundary value to the tokens, thereby generating the valid test data and invalid test data.

As a result of solving the tokens, the valid test data and the invalid test data for the parameters are generated. The valid test data for the parameter is generated as a result of solving the tokens with corresponding valid upper and lower boundaries. Likewise, the invalid test data for the parameter is generated as a result of solving the tokens with corresponding invalid upper and lower boundaries. Specifically, the valid test data is a first range of values limited by the valid upper and lower boundaries and the invalid test data is a second range of values lying outside the first range of values.

Further, it may be understood that valid or invalid test data may relate not only to the valid and invalid values but also to other properties of the parameter, such as data type and bit length. For example, if the parameters associated with the relational expression are configured to receive only integer data or string data, then the boundary values are equated to integer values or string values, respectively. For clarity, few examples have been elaborated to describe the test data generation within the testing system 102.

In a first example, consider param1 is an alphanumeric string of length 1 to 5. So for above condition, invalid data for param1 is any alphanumeric value whose length is greater than 5 e.g. "A123xrt".

In another example of the operation of the present testing system 102, a relational expression such as "param1=ABC[0-9]{1,4}" is generated based on the business rules associated with the parameter param1 in a program code. The relational expression is interpreted as containing a parameter named param1 which is capable of accepting an input string that has A, B and C as its first three letters. According to the relational expression, the first three letters of the string can then be followed by a numeral of 1 to 4 bits where each bit should range between zero and nine.

The valid test data corresponding to the relational expression is a logical AND of two tokens wherein token1 is equal to ABC (token1==ABC) and token2 is a single digit between 0 to 9 (token2=0-9). In other words, any alphanumeric string having A, B and C as its first three letters followed by a digit lying between 0-9999 is a valid test data. The invalid test data corresponding to the relational expression is generated by selecting values such that it does not meet the condition specified by the above mentioned relational expression. Accordingly, the invalid test data may be generated by either violating the condition expressed by token1 (token1!=ABC) or token2 (token2<0 OR token2>9999).

It may be understood that in accordance with the aforementioned example, the testing system 102 directly generates the valid test data and the invalid test data for the parameter, without generating valid and invalid boundary values of the parameters. This is so as the relational expression "param1=ABC[0-9]{1,4}" is a regular expression. Such behavior may be regarded as one implementation of the operation of the testing system 102.

In accordance with another example of the testing system 102, a user specified business rule is converted to a relational expression. Such expression can then be tokenized and parsed for generation of invalid test data. In the present case, a relational expression "age 28" i.e., parameter 'age' should be equal to 28, may be created from a business rule provided to the testing system 102. The invalid test data could be generated based on the lower invalid boundary value and the upper invalid boundary value and it may include any positive integer except '28'. Similarly, the valid test data is generated based on the condition specified by the above mentioned relational expression. In this case the valid data generated is the numeral '28' which satisfies the condition of the above mentioned relational expression.

In yet another example of the testing system 102, a relational expression such as "structure (string, int, string)" is generated based on the business rules associated with a group of parameters in the program code. Such relational expression can be interpreted as containing a structure variable which is capable of holding two string values and one integer value. Here the words "string" and "int" represent the data types of the variables, 'Int' represents an integer data type and 'string' represents textual forms of data. The relational expression is then tokenized into several tokens, since there are three parameters in the relational expression such that each token of the relational expression represents at least one parameter contained in the structure variable.

For clarity, first token of the relational expression or first parameter can be termed as "param1" which holds a string value, second parameter can be termed as "param2" which holds an integer value, third parameter can be termed as "param3" which holds a string value. The boundary values for parameters param1, param2 and param3 are identified. If the parameter represented by "param1" is a string capable of accepting a string of length up to '5', then the lower boundary value, in terms of length of the string in this case, is '1' and the upper boundary value is '5'. Similarly, if the parameter represented as "param2" is capable of accepting integers ranging from '1' to '5', then the lower boundary value is '1' and the upper boundary is '5'. Similarly, if the parameter represented by "param3" is capable of accepting strings of length not exceeding '10', then the lower boundary value, again in terms of length of the string, is '1' and the upper boundary value, also in terms of length of the string, is '10'.

After the step of identification of boundary values for the parameters, the invalid boundary values for the parameter are derived. In the case of "param1", the invalid data boundary values range beyond '5' since string lengths equal to '5' are accepted as inputs corresponding to "param1". Therefore the lower invalid boundary value can be equated to i.e. string of length 0 and the upper invalid boundary value can be equated to '6', i.e. string of length 6. Similarly for "param2" the upper invalid boundary value needs to be in excess of '5' since integers below or equal to '5' are accepted as inputs corresponding to "param2". Therefore, the upper invalid boundary for "param2" can be '6', i.e. string of length 6 and the lower invalid boundary value can be ' ', i.e. string of length 0. Similarly, in the case of "param3" the upper invalid boundary value is in excess of '10' since integers equal to or below '10' are accepted as inputs corresponding to "param3". Accordingly, for 'param 3' the upper invalid boundary value is '11', i.e. string of length 11 and the lower invalid boundary value is ' ', i.e. string of length 0.

After identifying the lower and upper boundary values and the lower and upper invalid boundary values, the tokens are solved based on the identified boundary values. The values that are available between a range of valid lower and upper boundaries and invalid lower and upper boundaries values are assigned to the parameters represented by the tokens. Accordingly, the valid test data and invalid test data are generated.

In an implementation of the testing system 102, the user is provided with the facility of generating the permutations of the boundary values and the invalid boundary values, The user is provided with a display of a complete set of these parameters contained within a particular block of program code that needs to be tested. The identified boundary values and the invalid boundary values that correspond to the listed parameters are also displayed along with the parameters. The user is provided with the option of selecting either all the parameters or a few of the parameters while ignoring the rest. For example, if "param1", "param2" and "param3" are the three parameters that are included within the program block under consideration, the user can choose to select param1 or param2 or param 3 or any two or all the three parameters.

Continuing with example, when the user selects a particular parameter, all the boundary values and the invalid boundary values that correspond to the selected parameter are automatically selected. However the user may choose only certain boundary and invalid boundary values. Subsequently, the permutations of the valid test data and the invalid test data are created for the parameters based on the selected boundary values and invalid boundary values.

FIG. 2 illustrates exemplary components of the testing system 102, in accordance with an embodiment of the present subject matter. In said embodiment, the testing system 102 includes a processor 202, I/O interface(s) 204, and a memory 206. The processor 202 is coupled to the memory 206. The processor 202 may be implemented as one or more microprocessors, microcontrollers, digital signal processors, central processing units, state machines, logic circuitries, and/or any devices that manipulate signals based on operational instructions, Among other capabilities, the processor 202 is configured to fetch and execute computer-readable instructions stored in the memory 206.

The I/O interface(s) 204 may include a variety of software and hardware interfaces, for example, a web interface allowing the testing system 102 to interact with the client devices 106. Further, the interface(s) 204 may enable the testing system 102 to communicate with other computing devices, such as web servers and external repositories or databases. The interface(s) 204 can facilitate multiple communications within a wide variety of networks and protocol types, including wired networks, for example LAN, cable, etc., and wireless networks such as WLAN, cellular, or satellite. The interface(s) 204 may include one or more ports for connecting a number of computing devices to each other or to another server.

The memory 206 can include any computer-readable medium known in the art including, for example, volatile memory RAM), and/or non-volatile memory EPROM, flash memory, etc.). The memory 206 includes one or more module(s) 208 and data 210. In one embodiment, the modules 208 further include the test data generation module 108, a display module 212 and other module(s) 214. The test data generation module 108 in turn includes a relational expression creation module 216, a boundary value recognition module 218 and a solver module 220. In one embodiment, the modules 208 may include a processing module 222.

The data 210 serves, amongst other things, as a repository for storing data processed, received and generated by the one or more of the module(s) 208. It may be mentioned that the data 210 stores the relational expression data 224, boundary value data 226, test input data 228 and other data 230. Such database may be the memory 206 of the testing system 102 or a data repository associated therewith.

In operation, the relational expression creation module 216, hereinafter referred to as the creation module 216, obtains rules associated with a set of parameters of the program code. In one embodiment, creation module 216 automatically extracts the rules from a formal business requirement specification. In an example, the specification may be based on Java or extensible markup language (XML). In other embodiment, the creation module 216 receives the inputs entered by the user through a user interface and based on the inputs, the creation module 216 determines rules associated with the set of parameters. The inputs entered by the user may in turn be rules based on requirement specifications, business constraints or business scenarios.

Further, the creation module 216 creates a relational expression corresponding to the parameters based on the obtained rules. As described previously, the rules describe the format of a valid test data and invalid test data for various parameters in the program code. The combination of the rules and the relational expression are stored in the relational expression data 224.

Further, the boundary value recognition module 218, hereinafter referred to as the recognition module 218, receives the relational expression from the creation module 216. The relational expression is then tokenized into tokens and then such tokens are parsed by the recognition module 218 to determine boundary values and invalid boundary values of the parameters. As mentioned before, the valid and invalid boundary values are categorized into upper values and the lower values. The identified boundary value and invalid boundary values are stored as the boundary value data 226.

Furthermore, the solver module 220 receives the tokenized relational expression in the form of tokens and the corresponding boundary values and invalid boundary values of the parameters. The solver module 220 solves the tokens using the lower and upper boundaries of the valid and invalid boundary values of the parameters for generating the valid test data and the invalid test data for the parameters. Such generated data is then stored in the test input data 228.

Further, the display module 212 displays the valid and invalid test data along with the corresponding parameters of the program code. As mentioned before, the user can either choose entire test data or can be discrete while choosing the type of test data for the parameters.

In one embodiment, once the valid and invalid test data has been obtained for the parameters of the program code, the processing module 222 tests the program code using the valid and invalid test data as input data. The processing module 222 provides the test data as input to the corresponding parameters of the program code and executes the program code. The results of the program code execution as displayed by the display module 212 and may be stored within other data 228.

In addition, in an embodiment, the processing module 222 implements a traceability between the business rules and the test data. In other words, the user is provided a graphical user interface through which the test data can be associated with corresponding business rules employed for the generation of the test data.

However, in another embodiment, the testing system 102 may not include the processing module 222. In such an embodiment, other modules 214 may include a communication module (not shown in figure) that may be configured to provide the generated valid and invalid test data to a testing tool. Thus, in one embodiment, the testing system 102 may only incorporate an interface to a device or system where the testing may be performed instead of performing the testing in the testing system 102 by the processing module 222. As is apparent, in such embodiments, the display module 212 may display only the generated valid and invalid test data and not the result obtained by testing the program code by using the generated valid and invalid test data.

Furthermore, as part of the communication module, various reports in the CSV format, Microsoft Excel format, XML format, etc may be generated. Such report may include the generated test data organized in an order as defined by the user. Still further, the report may also denote an interrelationship between the test data and the business rules, thereby showcasing traceability. In another implementation, the data reports can be generated in a custom data format specified by the user.

FIG. 3 illustrates an exemplary method 300 for generating test data, in accordance with the present subject matter. The exemplary method 300 may be described in the general context of computer executable instructions and may be a computer implementable method. Generally, computer executable instructions can include routines, programs, objects, components, data structures, procedures, modules, functions and the like that perform particular functions or implement particular abstract data types. The method may also be practiced in a distributed computing environment where functions are performed by remote processing devices that are linked through a communication network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or a combination thereof.

In accordance with one embodiment of the present subject matter, the method 300 may be implemented in the previously described testing system 102. However, it will be appreciated by one skilled in the art that such an embodiment is not limiting. The method 300 may be implemented in a variety of similar testing systems.

The method 300 is initiated at block 302 upon the determination of at least one relational expression corresponding to a set of parameters of a program code. As mentioned before, such expression is determined based on a set of rules associated with the parameters. The rules may be automatically extracted or provided by a user.

At block 304, a set of boundary values of the parameters is identified from the relational expression. The set of boundary values comprises valid and invalid boundary values. These boundary values may be categorized into an upper value and a lower value. Such values may be identified based on tokenization of the relational expression into tokens and then parsing of such tokens as explained previously.

Further, at block 306, valid test data and invalid test data are generated for the parameters are based on the boundary values of the parameters. Specifically, the valid test data is a first range of values limited by the boundary values and the invalid test data is a second range of values lying outside the first range of values.

The testing system 102 as described by the present subject matter facilitates a quick generation of precise invalid test data for any software based application. Accordingly, the present testing system 102 acts as an automated invalid test data generator for performing negative testing for the software application. This reduces manual inputs, time and efforts of a testing professional. In addition, the testing system also generates valid test data.

Furthermore, the testing system 102 does not employ production data for the purposes of test data generation, thereby generating the test data that does not relate to user sensitive data or private data of the user.

Although embodiments for testing have been described in language specific to structural features and/or methods, it is to be understood that the present subject matter is not necessarily limited to the specific features or methods described. Rather, the specific features and methods are disclosed as exemplary embodiments for test management in an organization.

We claim:

1. A method for generating test data, the method comprising:
    obtaining, by a processor, at least one rule based on a requirement specification, wherein the requirement specification is obtained from a user and is based on business and functional requirements, and wherein the at least one rule indicates a format of at least one of valid test data and invalid test data for testing of at least one parameter of a program code, and wherein the at least one rule is obtained independent of analyzing the program code;
    determining, by the processor, at least one relational expression corresponding to the at least one parameter of the program code based on the at least one rule;
    tokenizing, by the processor, the at least one relational expression into a plurality of tokens, and parsing the plurality of tokens to identify and then assign one or more valid upper and lower boundary values and one or more invalid upper and lower boundary values for each token, of the at least one parameter of the program code;
    generating, by the processor, one or more valid test data based on the assigned one or more valid upper and lower boundary values for each token of the at least one parameter of the program code, wherein the generating one or more valid test data comprises solving the at least one relational expression based on the one or more valid upper and lower boundary values;
    generating, by the processor, one or more invalid test data based on the assigned one or more invalid upper and lower boundary values for each token of the plurality of tokens of the at least one parameter of the program code, wherein the generating one or more invalid test data comprises solving the at least one relational expression based on the one or more invalid upper and lower boundary values; and
    wherein the one or more valid test data is a first range of values limited by the one or more valid upper and lower boundary values and the one or more invalid test data is a second range of values lying outside the first range of values and limited by the one or more invalid upper and lower boundary values.

2. The method as claimed in claim 1, wherein determining the at least one relational expression comprises deriving the at least one relational expression based on the at least one rule entered by the user through a user interface.

3. The method as claimed in claim 1, further comprising:
    testing the program code based on the one or more valid test data and the one or more invalid test data; and
    displaying the one or more valid test data, the one or more invalid test data with the at least one parameter of the program code.

4. The method as claimed in claim 1, wherein the generated one or more test data is provided to the program code as input for testing the program code against the one or more test data.

5. A testing system for generating test data comprising:
    a processor;
    and a memory coupled to the processor, the memory comprising: a test data generation module to generate one or more valid test data and one or more invalid test data for a program code, wherein the test data generation module further comprises:
        a relational expression creation module configured to obtain at least one rule based on a requirement specification, wherein the requirement specification is obtained from a user and is based on business and functional requirements, and wherein the at least one rule indicates format of at least one of valid test data and invalid test data for testing of at least one parameter of a program code, and wherein the at least one rule is obtained independent of analyzing the program code;

a generation module to determine at least one relational expression corresponding to the at least one parameter of the program code based on the at least one rule;

a tokenizing module for tokenizing the at least one relational expression into a plurality of tokens, and parsing the plurality of tokens to identify and then assign one or more valid upper and lower boundary values and one or more invalid upper and lower boundary values for each token, of the at least one parameter of the program code;

a solver module to generate one or more valid test data and one or more invalid test data for each token of the plurality of tokens of the at least one parameter of the program code based on the assigned one or more valid upper and lower boundary values and the assigned one or more invalid upper and lower boundary values, respectively, wherein the one or more valid test data generated and the one or more invalid test data generated comprises solving the at least one relational expression based on the one or more valid upper and lower boundary values and the one or more invalid upper and lower boundary values of the at least one parameter of the program code, respectively; and wherein the one or more valid test data is a first range of values limited by the one or more valid upper and lower boundary values and the one or more invalid test data is a second range of values lying outside the first range of values and limited by the one or more invalid upper and lower boundary values.

6. The system as claimed in claim 5, further comprising:
a processing module configured to test the program code based on the one or more valid test data and the one or more invalid test data; and
a display module to display the one or more valid test data and the one or more invalid test data with the at least one parameter of the program code of the test data generation module and the processing module.

7. The system as claimed in claim 5, wherein the relational expression creation module extracts the relational expression from at least one rule from the user for the valid and invalid upper and lower boundary value generation.

8. The system as claimed in claim 5, wherein the relational expression creation module accepts the at least one rule from the user through a user interface.

9. A non-transitory computer-readable medium having embodied thereon a computer program for executing a method comprising:
obtaining, by a processor, at least one rule based on a requirement specification, wherein the requirement specification is obtained from a user and is based on business and functional requirements in the form of rules, and wherein the at least one rule indicates a format of at least one of valid test data and invalid test data for testing of at least one parameter of a program code, and wherein the at least one rule is obtained independent of analyzing the program code;

determining, by the processor, at least one relational expression corresponding to the at least one parameter in the program code, based on the at least one rule;

tokenizing, by the processor, the at least one relational expression into a plurality of tokens, parsing the plurality of tokens to identify and then assign one or more valid upper and lower boundary values and one or more invalid upper and lower boundary values for each token of the at least one parameter of the program code;

generating, by the processor, one or more valid test data based on assigned the one or more valid upper and lower boundary values for each token of the at least one parameter of the program code, wherein the generating one or more valid data comprises solving the at least one relational expression based on the one or more valid upper and lower boundary values;

generating, by the processor, one or more invalid test data based on assigned the one or more invalid upper and lower boundary values for each token of the plurality of tokens of the at least one parameter of the program code, wherein the generating one or more invalid data comprises solving the at least one relational expression based on the one or more invalid upper and lower boundary values; and wherein the one or more valid test data is a first range of values limited by the one or more valid upper and lower boundary values and the one or more invalid test data is a second range of values lying outside the first range of values and limited by the one or more invalid upper and lower boundary values.

10. The non-transitory computer-readable medium as claimed in claim 9, wherein the determining the at least one relational expression comprises deriving the at least one relational expression based on the at least one rule entered by the user through a user interface.

* * * * *